(12) United States Patent
Karayi et al.

(10) Patent No.: US 8,392,147 B2
(45) Date of Patent: Mar. 5, 2013

(54) MONITORING THE PERFORMANCE OF A COMPUTER

(75) Inventors: Sumir Karayi, London (GB); Mark Blackburn, London (GB); Andrew Hawkins, London (GB); Fredrick Kasadha, London (GB); Agnieszka Sosna, London (GB); Edward Sykes, London (GB); Richard Cudd, London (GB); Sophie Chang, London (GB)

(73) Assignee: 1E Limited, London (GB)

( * ) Notice: Subject to any disclaimer, the term of this patent is extended or adjusted under 35 U.S.C. 154(b) by 295 days.

(21) Appl. No.: 12/860,953

(22) Filed: Aug. 23, 2010

(65) Prior Publication Data
US 2011/0054846 A1 Mar. 3, 2011

(30) Foreign Application Priority Data
Sep. 2, 2009 (GB) .................... 0915238.0

(51) Int. Cl.
*G06F 15/00* (2006.01)
*G06F 15/16* (2006.01)
*G06F 1/26* (2006.01)
(52) U.S. Cl. .......... 702/186; 709/224; 713/300
(58) Field of Classification Search ........... 702/186; 709/224, 227; 713/300
See application file for complete search history.

(56) References Cited

U.S. PATENT DOCUMENTS

| | | | |
|---|---|---|---|
| 5,396,635 A * | 3/1995 | Fung ............... | 713/323 |
| 5,903,757 A | 5/1999 | Gretz et al. | |
| 6,826,575 B1 | 11/2004 | Waclawski | |
| 6,990,593 B2 | 1/2006 | Nakagawa | |
| 7,080,271 B2 | 7/2006 | Kardach | |
| 7,111,179 B1 | 9/2006 | Girson et al. | |
| 7,222,269 B2 | 5/2007 | Kurinami et al. | |
| 7,340,378 B1 | 3/2008 | Floyd et al. | |
| 7,421,413 B2 | 9/2008 | Frank et al. | |
| 7,421,491 B2 | 9/2008 | Tameda et al. | |
| 7,647,513 B2 | 1/2010 | Tobias et al. | |
| 2002/0004912 A1 | 1/2002 | Fung | |
| 2003/0196126 A1 | 10/2003 | Fung | |
| 2003/0204781 A1 | 10/2003 | Peebles et al. | |

FOREIGN PATENT DOCUMENTS

| | | |
|---|---|---|
| EP | 0666526 | 8/1995 |
| EP | 0978879 | 2/2000 |
| WO | WO/95/31782 | 11/1995 |

* cited by examiner

*Primary Examiner* — Bryan Bui
(74) *Attorney, Agent, or Firm* — Prakash Nama; Global IP Services, PLLC (57) ABSTRACT

A computer implemented method monitors a computer to determine values of a plurality of activity metrics of the monitored computer. A weighted combination of functions of the determined values is calculated as a measure of performance of the monitored computer. The weighted combination may be a weighted combination of net values of the activity metrics. In one method, the net values are calculated as the determined values of the plurality of activity metrics of the monitored computer excluding contributions to the values from one or more predetermined activities. In another method, the net values are calculated as total values of the respective activity metrics from which the total values of the one or more predetermined activities are subtracted. The weighted combination may be used to control power consumption or otherwise take action in relation to the computer.

37 Claims, 10 Drawing Sheets

Figure 12
Virtual machines

MONITORING THE PERFORMANCE OF A COMPUTER

FIELD OF THE INVENTION

The present invention relates to monitoring the performance of a computer. An embodiment of the invention relates to controlling a computer.

BACKGROUND OF THE INVENTION

Computers consume electrical energy to operate. They consume electrical energy even when they are apparently idle. An idle computer may consume up to 60% of its fully active power consumption. That is wasteful. Large server farms having hundreds or even thousands of servers consume very large amount of power. The power consumed by a computer is released as heat and server rooms thus require air conditioning equipment which in turn also consume power.

In large server farms, it is likely that some or even many servers are idle for at least part of the time and some may even be idle most to the time. Idle servers waste power and take up space which may be better utilised. Thus it is desirable to monitor the performance of servers and computers in general so as to, for example, identify computers which are not performing a useful purpose.

Servers may be virtualised. Whilst power consumption is not attributable to a virtual server in the same way as to a "real" server, a virtual server requires computing resources which are wasted if the virtual server serves no useful purpose. As with real servers, virtual servers may be idle for part of even most of the time and it is thus desirable to monitor the performance of virtual servers or virtual computers in general so as to, for example, identify virtual computers which are not performing a useful purpose.

SUMMARY OF THE INVENTION

In accordance with one aspect of the present invention, there is provided a computer implemented method of monitoring the performance of a computer comprising monitoring the computer to determine the values of an activity metric of the monitored computer and calculating, as a measure of performance of the monitored computer, a function of the determined value weighted by a weight which has a value related to the value of the metric.

According to another aspect of the present invention, there is provided a computer implemented method of monitoring the performance of a computer comprising monitoring the computer to determine the values of a plurality of activity metrics of the monitored computer wherein the said values of the plurality of activity metrics of the monitored computer are values excluding contributions to the values from the one or more predetermined activities, and calculating a weighted combination of functions of the determined values as a measure of performance of the monitored computer.

An embodiment of the invention provides a computer implemented method of monitoring the performance of a computer comprising monitoring the computer over a predetermined monitoring period of time, determining over the monitoring period the values of a plurality of activity metrics of the monitored computer and calculating a weighted combination of at least functions of the determined values as a measure of performance of the monitored computer.

The weighted combination may include functions of other values.

In an embodiment of the method, the weighted combination provides a certainty value indicative of whether the computer is serving a useful purpose during the monitoring period. The certainty value provides a manager with a value by which he or she can judge the usefulness of the computer. The certainty value may be used for other purposes, for example controlling the computer.

In an implementation of the method, the said values of the plurality of activity metrics of the monitored computer are values excluding contributions to the values from the one or more predetermined activities. Determining the said values may comprise determining the total values of the respective activity metrics of the monitored computer, determining the contribution(s) to the said total values of the said one or more predetermined activities, and subtracting the said contribution(s) from the said total values to provide net values, the said weighted combination being a weighted combination of the net values.

Data identifying the said one or more predetermined activities may be stored in a predetermined data set, and the data set is used to determine the contributions of which activities are to be subtracted from the said total values.

The implementation using net values of activity metrics may be regarded as allowing the monitoring of a computer based on the net useful work it performs. The inventors' further inventive insight is that knowing the main purpose of a computer enables a user of designer to select activities (hereinafter referred to as "non-useful activities") which do not contribute to that main purpose and use that to provide a measure of net useful work. Non-useful activity as represented by the predetermined activities is subtracted from, or excluded from, the total work done by the computer to provide a measure of net useful work. What is not useful may be a subjective judgement of the designer or user and depends on their judgement of the function to be carried out by the computer. For example a computer which acts as a server in a network has the main function of serving external clients. Activities such as antivirus and defragmentation which do not directly serve the main purpose may be regarded as non-useful to the main purpose of one computer but could be regarded as useful in another computer.

In accordance with another aspect of the invention, there is provided a computer implemented method of monitoring the performance of a computer comprising monitoring the computer over a predetermined monitoring period of time, determining over the monitoring period the values of at least one activity metric of the monitored computer and calculating as at least part of a measure of the performance of the computer a function of the measured value weighted by a weight which is a function of the measured value or a function of a threshold value with which the function of the measured value is compared to provide the measure of performance.

The measure of performance is a value of certainty that the computer is performing a useful function The weight which is a function of the measured value, or a function of a threshold value with which the function of the measured value is compared, operates to provide a measure of the confidence that the measure of performance reflects the usefulness of the computer.

It will be appreciated that embodiments of the invention provide a measuring instrument which measures the usefulness of a computer An implementation of the method of the invention comprises controlling the computer in dependence on the value of the weighted combination.

Further features and advantages of the invention will become apparent from the following description of preferred embodiments of the invention, given by way of example only, which is made with reference to the accompanying drawings.

DETAILED DESCRIPTION OF ILLUSTRATIVE EMBODIMENTS OF THE INVENTION

Figure 1:
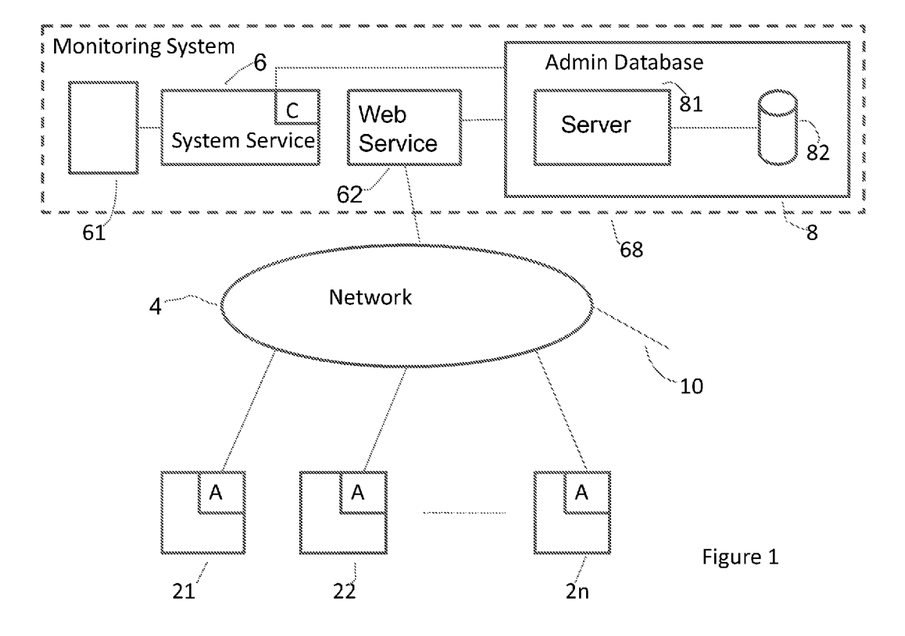
FIG. 1 is a schematic diagram of a network of computers, in this example, servers.
Figure 2:
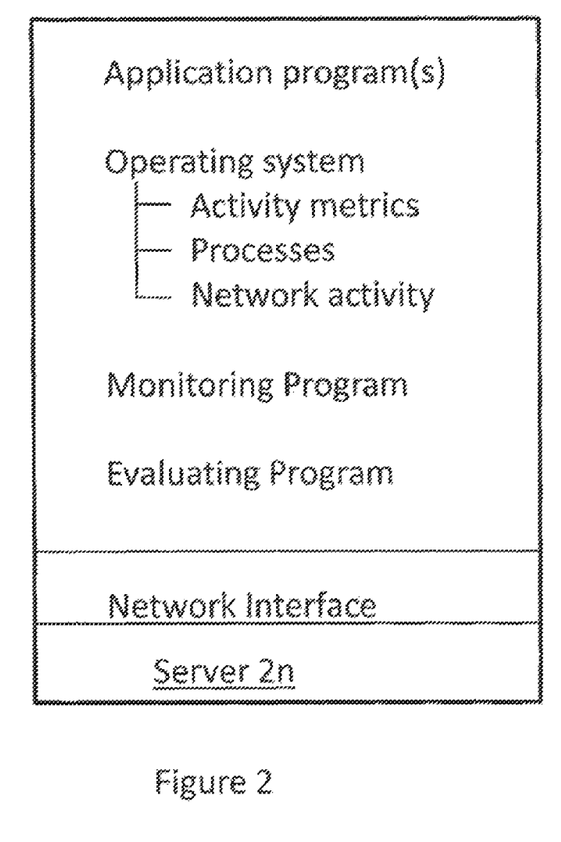
FIG. 2 is a schematic diagram of an operating system and programs present on server of FIG. 1.
Figure 3:
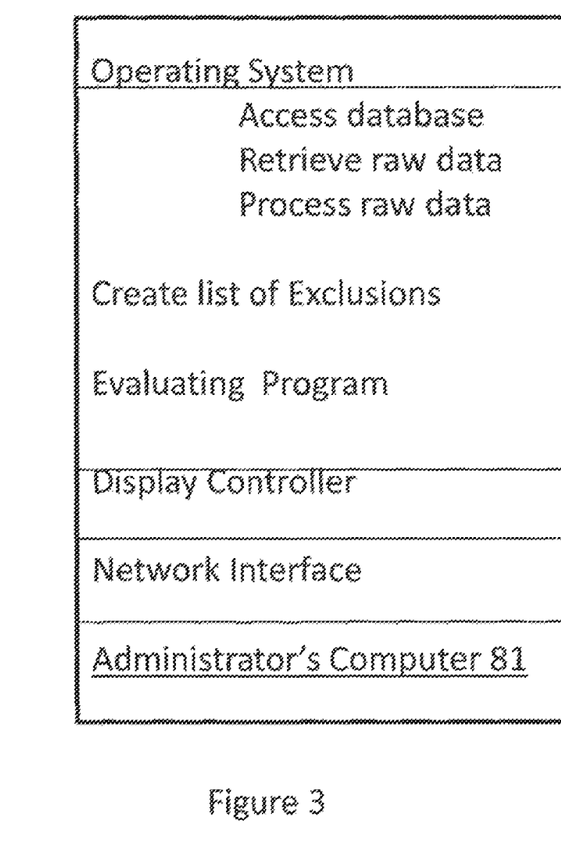
FIG. 3 a schematic diagram of an operating system and programs present on an administrator's workstation of FIG. 1.

Overview of an Example of a System in Accordance with the Invention: FIGS. 1, 2 and 3.

Referring to FIG. 1, the system comprises servers 21, 22, 2n, an administrator's workstation 6 with a display device 61, a web service 62 running on a computer, and an administrative database 8 connected by a network 4. The administrator's console interacts with the database 8. The webservice interacts with the database and the servers 2n. The servers 21 to 2n may be servers of a large server farm having a large number of servers, for example hundreds or more servers. The database may itself comprise a server 81 having a data storage device 82. The database 8 and the workstation 6 together form a monitoring system 68.

In this example of the invention, as illustrated in FIG. 2, each server 2n has, amongst other programs: an operating system; one or more application programs which define the role of the server; a monitoring program, denoted A in FIG. 1, which monitors activity of the server; and a network interface. The monitoring program interacts with the operating system to obtain the data including information identifying the server and other data, relating to the activities of the computer as described herein below. The monitoring program sends the raw monitored data to the database 8 via the network interface, the network 4 to the webservice 62 which transfers the raw data to the database 8. In this example, the monitoring programs A communicate with the webservice using the http protocol.

Each server 2n may have a power control program which controls the power state of the server. If provided, the power control program interacts with the operating system to obtain data relating to the activities of the computer. Power control may be performed on the basis of settings downloaded by the server 2n from the database. The settings are created by the administrator.

Figure 4:
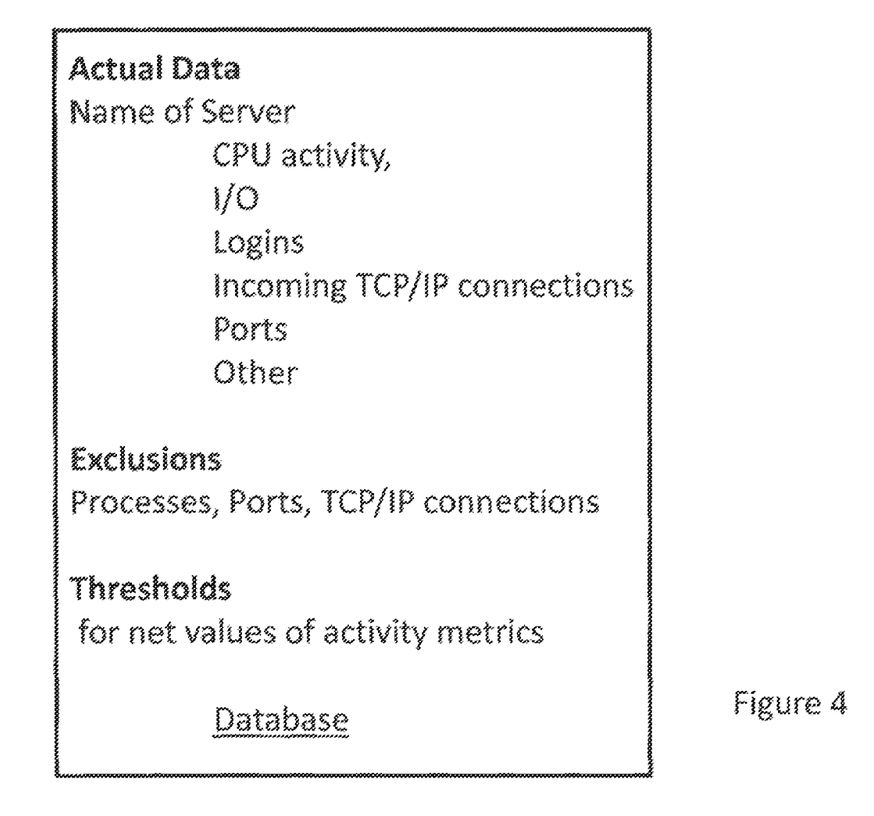
FIG. 4 is a schematic diagram of the contents of a database of FIG. 1.

In this example, as indicated in FIG. 3, the administrator's workstation 6 has, amongst other programs, an operating system, a network interface, a display controller, and a program for interfacing with the database Referring to FIG. 4, the database stores and processes the raw data provided by the monitoring program of a server. In this example the raw data comprises the name of the server, and metrics of CPU activity, I/O, logins, incoming TCP/IP connections, names of processes, identification of incoming TCP/IP connections by a combination of port number used and processes associated with the port and the connection.

The raw data is analysed as discussed below and a data set of excluded processes and a data set of excluded incoming TCP/IP connections identified by a combination of port number and associated process(es) are stored. Also thresholds of activity metrics are stored.

The database may also store the following data which may be used to provide the dataset of excluded activities: source IP address of incoming TCP/IP connections, data identifying any connection to a process X, any connection to a port Y or any connection from a source IP address Z.

Figure 5:
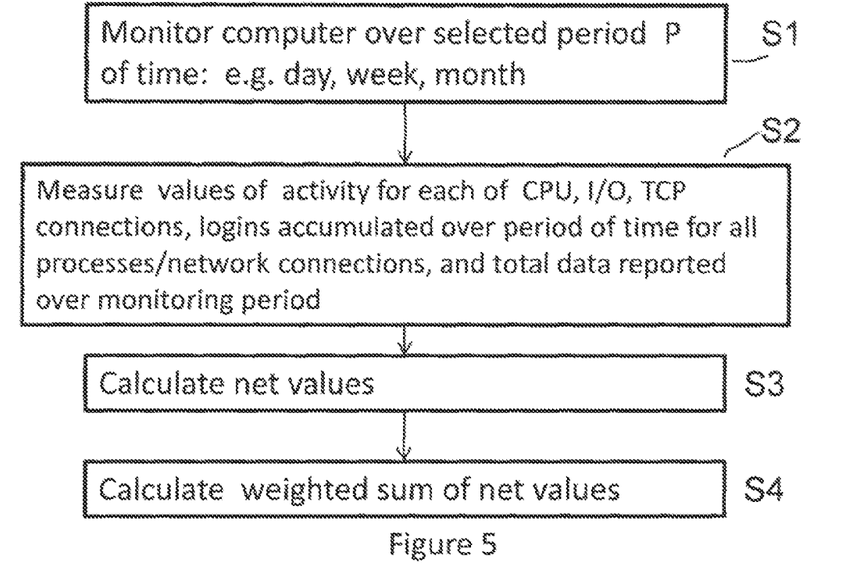
FIG. 5 is a schematic flow diagram of a method, in accordance with the invention, of monitoring the performance of a computer to produce a performance measure.

Overview: FIG. 5

Referring to FIG. 5, in step S1 a computer is monitored over a selected period P of time for example a day, a week a month or any other period. Step S2, measures the values of activity, or activity metrics, for each of a plurality of activities, in this example CPU activity, I/O activity, incoming TCP/IP connections, and logins accumulated over the monitoring period P. Step S3 calculates net values of those activities, that is values which exclude contributions from predetermined activities. Examples of steps S2 and S3 are described in more detail with reference to FIGS. 6 to 10. Step S4 calculates a performance measure C which is weighted combination of functions of the measured net values and of functions of other measures.

The activity metrics are produced by the operating system of the computer in known manner and accessed in known manner from the operating system.

Figure 6:
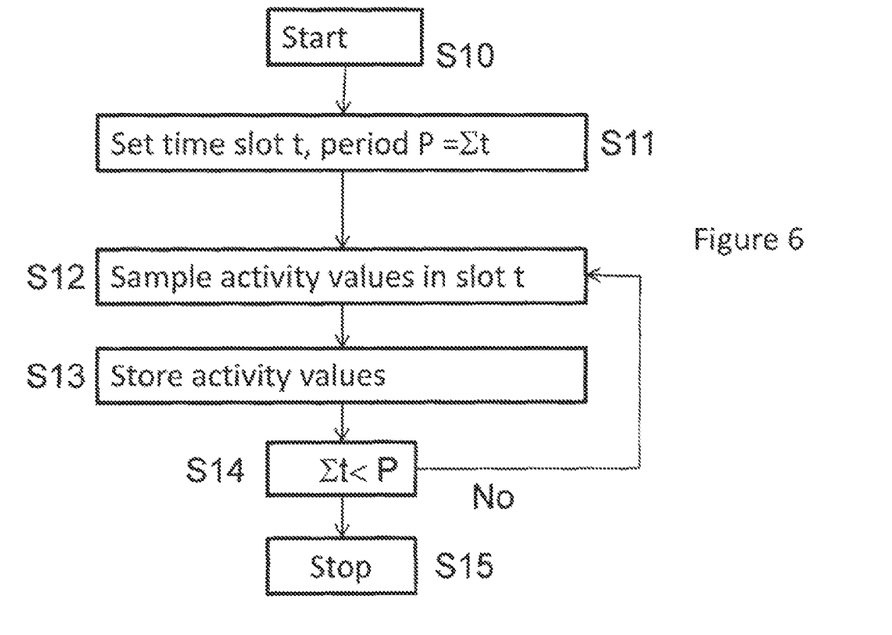
FIG. 6 is a flow diagram of a method of measuring values of activities.

Measuring Values of Activities: FIG. 6.

Referring to FIG. 6, step S2 is shown in more detail. In step S6, the period P is set and the duration of a time slot t is set. The activity metrics are measured in each time slot t. In step S7 and the values stored in step S8. Once the time period P expires as determined in by step S9, the process stops. The time period P is long compared with the time slot t. In this example P is 30 days and t is one day. Time period P is a period long enough to provide sufficient data to provide a reliable measure C of performance. Time slot t may be any period which is short compared to P. So as to provide sufficient data to provide a reliable measure of performance.

Example of the Weighted Sum

An example of the weighted combination is:

$$C=[Uu_wW1+Dd_wW2+Tt_wW3+L1_wW4]R_w+Bb_wW5+SW6$$

where

U is a utilization value which is the % of the time P CPU activity, measured as an average over time t, is below a preset threshold Ut, D data I/O value which is the % of the time P data I/O, measured as an average over time t, is below a preset threshold Dt, T is the number of TCP/IP connections made over the period P, L is the number of logons made over the period P, B is a business value in the range 0 to 10 set by a user or administrator as a matter of their subjective judgement, and S is a value dependent on the age of the BIOS of the monitored computer.

W1, W2, W3, W4, W5 and W6 are fixed weights which sum to 100, $R_w$ is a weight depending on the length of period P, $u_w$ is a weight dependent on a threshold value chosen to determine U, $d_w$ is a weight dependent on a threshold value chosen to determine D, $t_w$ is a weight dependent on the value of T, $l_w$ is a weight dependent on the value of L, $b_w$ is a weight dependent on the value of B The fixed weights W1 to W6 are chosen by the user of the designer of the system. They are for example: W1=10; W2=15; W3=40; W4=10; W5=15 and W6=10. Other values may be chosen. One way of choosing the weights is described below.

The business value B is 0 for low business value and 10 for high business value. A different range of business values may be chosen.

The value U is based on CPU activity. It may be based on total CPU activity: alternatively it may be based on net useful activity measured as described below. Different CPUs have different number of cores and operate at different frequencies so the utilization value U may be normalised to compensate for different processing powers of CPUs. Otherwise a slow processor would appear to be more useful than a fast processor carrying out the same function.

The value D may be based on total I/O: alternatively it may be based on net useful I/O as described below.

The value T may be based on total numbers of incoming TCP/IP connections: alternatively it may be based on net useful connections as described below.

The value L may be based on total logons: alternatively it may be based on net useful logons.

The value C is a measure of certainty. A high value of C indicates a high certainty that the monitored computer is NOT performing a useful purpose and a low value indicates it IS performing a useful purpose. Using net useful values enhances confidence that the value C indicates whether or not the monitored computer is serving a useful purpose.

Determining the Activity Value U and its Threshold Ut

To determine the activity value U, the CPU activity value is measured at the beginning and end of each sampling period t. The CPU activity values are held in performance counters which store cumulative values. The cumulative values are read to determine the gradient to obtain the average CPU activity value for the sampling period t. That is repeated for each sampling period t over the period P and the averages for each period t stored. The average values are compared with a threshold Ut to determine the proportion of period P for which the average values are less than the threshold. The time spent under the threshold is the value U.

Threshold Ut and Weight $u_w$

Figure 14A:
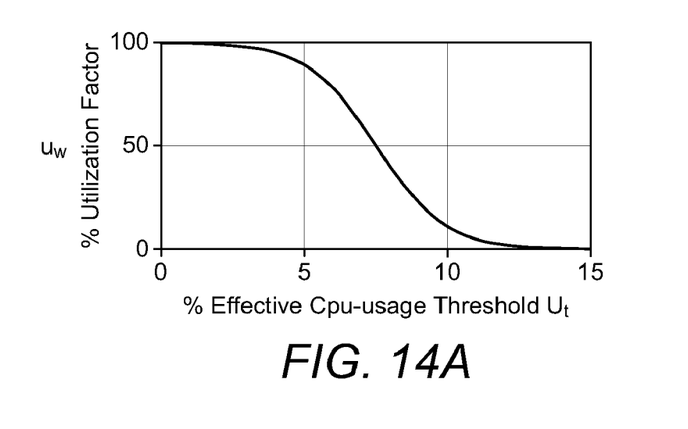
FIGS. 14A to 14F show functions of activity metrics and other measures.
Figure 14B:
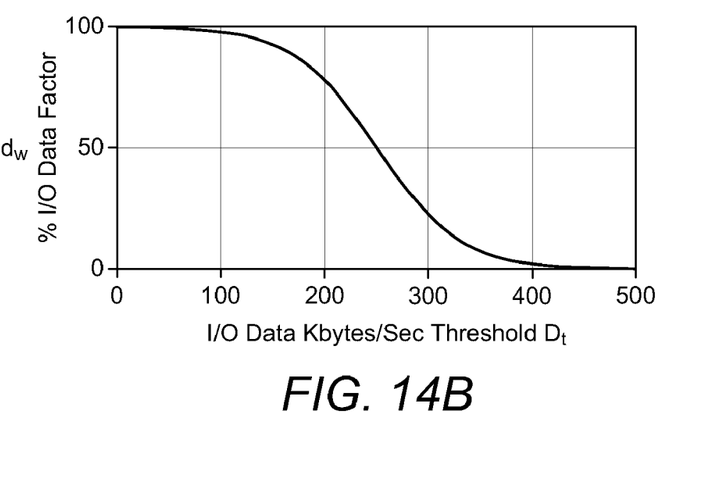

The threshold is chosen using a function of the form $1/(1+e^x)$ shown in FIG. 14A. For example the threshold may be chosen to be 5% effective CPU usage which corresponds to a % utilization factor of 90%. That % utilization factor is the weight $u_w$.

The function shown in FIG. 14A is designed to provide 100% utilization factor ($u_w$) when the threshold is 0% and 0% utilization factor when the threshold is 15% or more. Selection of the threshold is a matter of choice by the designer or user.

Whatever the proportion of time P spent under the threshold the value U is weighted by $u_w$, e.g. 90%. It is also weighted by the fixed weight W1.

Weight $R_w$

Figure 14C:
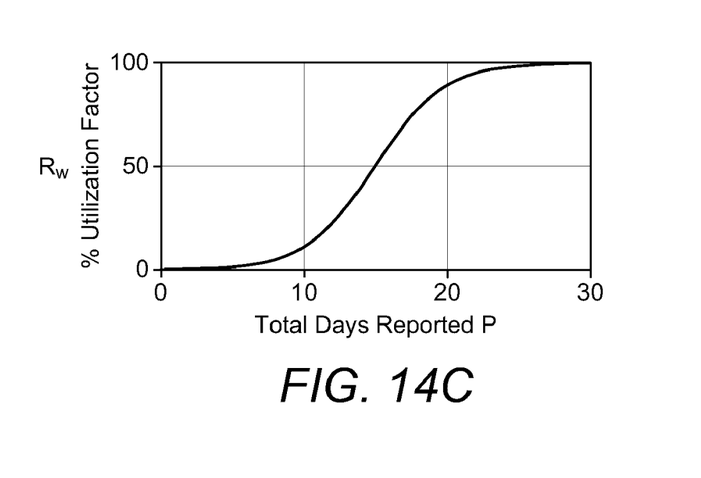

The longer the period P the greater the confidence in the value C. In this example P is set at 30 days. The weight Rw is chosen according to a function $1/(1+e^{-x})$ as shown in FIG. 14C. If the period P is 30 days then the weight Rw is 100%. If not it is a value % utilization factor set out in the ordinate corresponding to the actual total days reported.

Normalising U to Compensate for Number of Cores and Frequency of Operation of the CPU This may be done by weighting the threshold Ut as follows;

$$\text{Weighted } Ut = \text{unweighted } Ut \otimes \frac{\sqrt{EffectiveCpuFrequency}}{\sqrt{MaxCpuFrequency}}$$

where

EffectiveCpuFrequency=CpuFrequency (MHz)⊗ Number-of-Cores and Max-Cpu-Frequency=Max value of (CPU-Frequency⊗ Number-of-Cores) in the enterprise assuming there is a plurality of computers of having different CPUs in an enterprise.

Data I/O Value D and its Associated Threshold Dt and Weights

This is calculated in the same way as Utilization value U. The threshold Dt is chosen in the same way as Ut. The weight $d_w$ is chosen in the same way as weight $u_w$ and the weight $R_w$ is applied to D in the same way as it is applied to U.

Value T and its Associated Weights

Figure 14D:
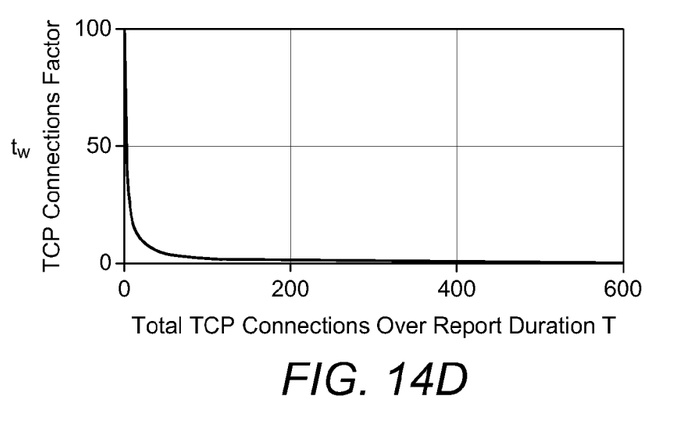

T is the net number of useful incoming TCP/IP connections occurring in the period P. The weight $t_w$ is chosen using a function of the form $k/(k+x)$ as shown in FIG. 14D where % TCP connections factor is the weight $t_w$ dependent on the value T.

The weight Rw is applied to T in the same way as to U and D.

Value L and its Associated Weights

L is the number of logons over the period P. It may be all logons or it may be useful logons as described below.

Figure 14E:
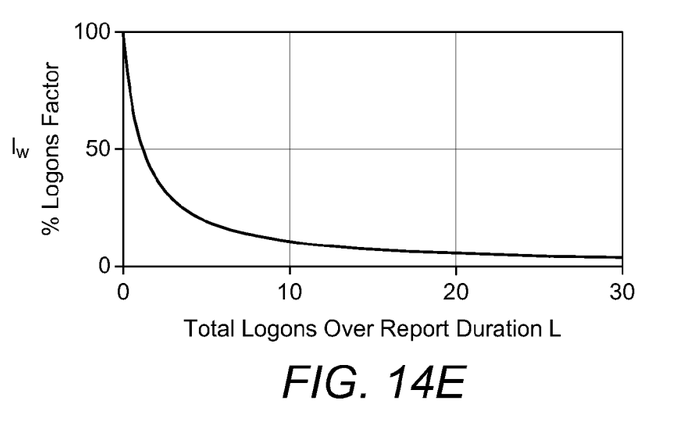

The weight $l_w$ is chosen using a function of the form $k/(k+x)$ as shown in FIG. 14E where % Logons factor is the weight $l_w$ dependent on the value L.

The weight Rw is applied to L in the same way as to U and D.

Business Value B

Figure 14F:
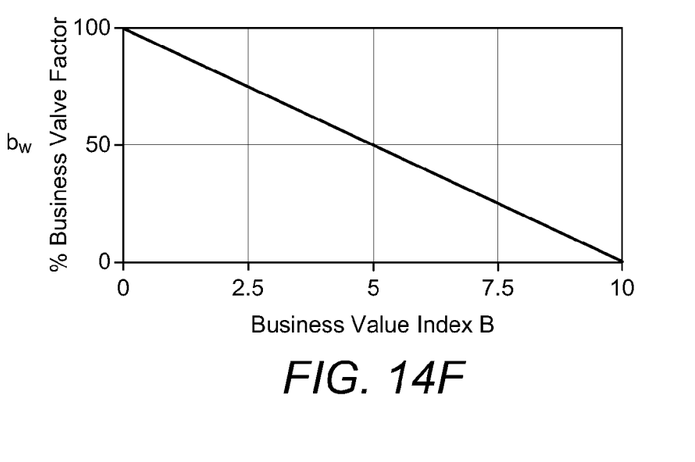

Business value is value in the range 1 to 10 chosen by the user. The relationship between value B and weight $b_w$ is an inverse linear relationship, and may have the form shown in FIG. 14F where value 10 corresponds to a weight of zero and value 0 corresponds to weight 100: i.e. the higher the business value the lower the certainty value C which indicates that the higher the business value the more likely the computer is useful. Business value may be omitted from the weighted sum.

Age S $$S = \text{Bios-Release-Date-Certainty} = \frac{(BRD - EBRD) \otimes BRDF}{(Now - EBRD)}$$

where:
BRD=Bios-Release-Date,
EBRD=Earliest Bios-Release-Date represented by an entry in a lookup table,
BRDF=Bios-Release-Date-Factor (represented by an entry in a lookup table, and
Now=current date.

Age may be omitted from the weighted sum.

Figure 7:
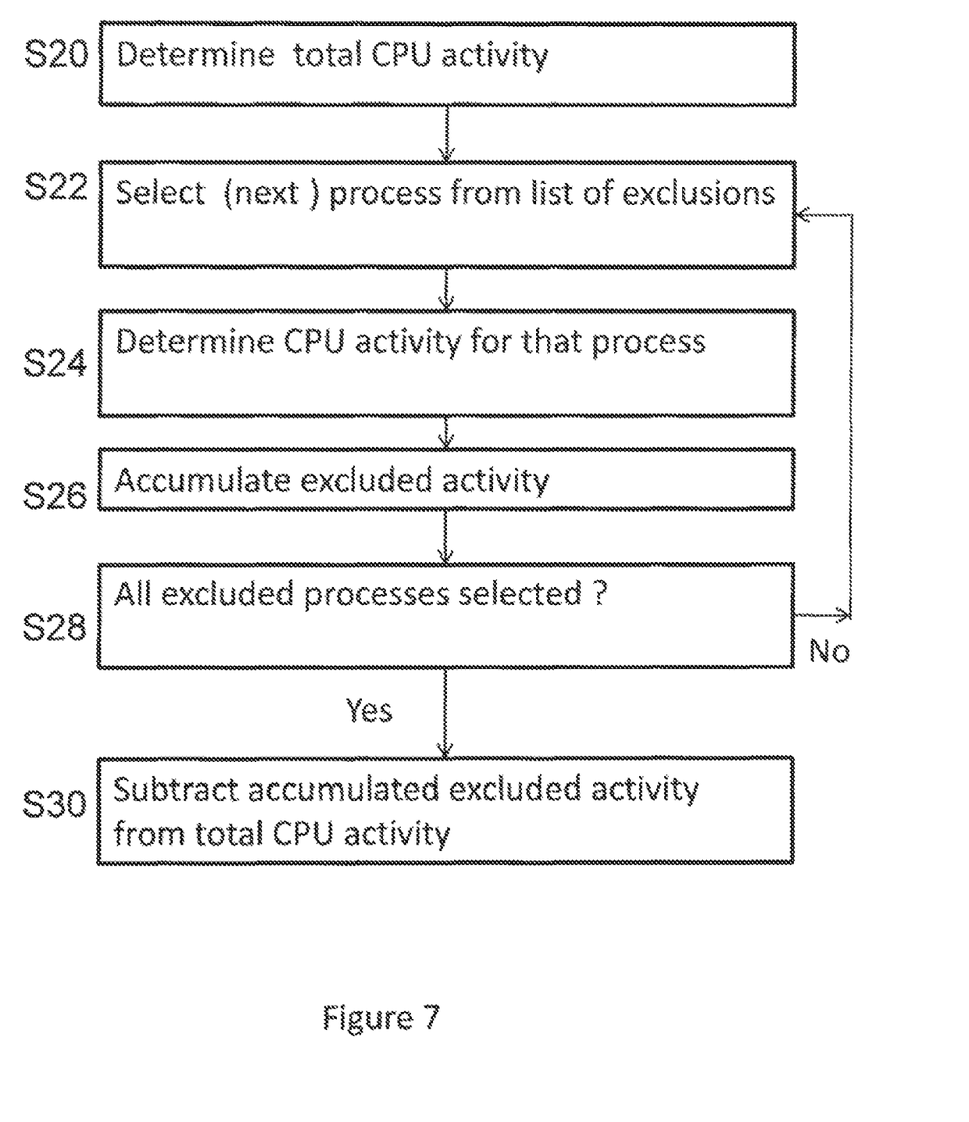
FIG. 7 is a diagram illustrating the calculation of net CPU activity.

Determine Net Useful CPU Activity: FIG. 7

Value U may depend on net useful CPU activity which may be measured as shown in FIG. 7. The measurement of net useful activity is based on a data set (for example a list) of processes, referred to herein as excluded processes, determined in advance to be non-useful activities. (The production of the data set is described below in the section "Creating Data Sets . . . ").

In the following description it is assumed that activity is measured over the predetermined period of time P. In step S20, the total activity of a CPU is determined and the total value is stored. The total value includes contributions from all processes running on the computer at the time of measurement plus activity attributable to the kernel of the operating system.

In steps S22 to S28, the contributions to the total value from all the excluded processes running at the time of measurement of the total are determined and subtracted from the total value to produce a net value. In this example that is done by selecting a process in step S22 from a list of excluded processes, determining the activity attributable to that excluded process in step S24, storing the activity value in an accumulator in step S26 and then at steps S28 and S22 selecting the next process and adding its activity value to the value stored in the accumulator in step S26. Once all the processes have been selected the value accumulated in step S26 is subtracted in step S30 from the total stored in step S20 to give the net value.

It will be appreciated that there are other methods of determining net useful CPU activity. For example the activity value of each excluded process may be subtracted one at a time from the total CPU activity instead of accumulating all the activity levels and then subtracting the accumulated values from the total CPU activity value.

The total activity of the CPU and the activity values of the processes are derived from the operating system in known manner using performance counters.

Figure 8:
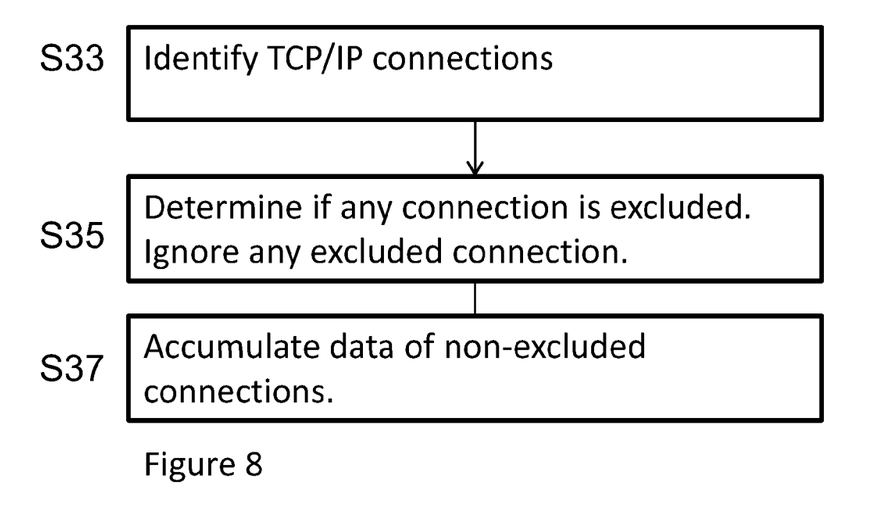
FIG. 8 is a diagram illustrating determining a net number of TCP/IP connections.

Determine Net Useful TCP/IP Connections T; FIG. 8

The value T may be based on net useful connections which may be determined as shown in FIG. 8. The incoming TCP/IP connections are identified in step S33. Similar to CPU activity, there is a list of excluded connections and those connections are identified in step S35 and ignored. Step S37 accumulates the number of non-excluded incoming TCP/IP connections. Steps S35 and S37 may be achieved by continuously monitoring incoming TCP/IP connections. Any useful connection, i.e. one not on the excluded list, sets a flag; connections on the list are ignored.

In an alternative implementation, the total number of all incoming TCP/IP connections is determined, the number of those connections on the excluded list is determined and the number of excluded connections is subtracted from the total number of all incoming TCP/IP connections.

The identification of an incoming TCP/IP connection is achieved using port numbers and processes provided by instrumentation data provided by the operating system. It is known how to do this. Information on how to do this is available from Microsoft Corporation for operating systems provided by them, but the invention is not limited to Microsoft's operating systems. The list of excluded incoming TCP/IP connections is list of port numbers and processes associated with those port numbers. The following may also be identified and used in the list of exclusions: source IP address of incoming TCP/IP connections, data identifying any connection to a process X, any connection to a port Y or any connection from a source IP address Z.

Figure 9:
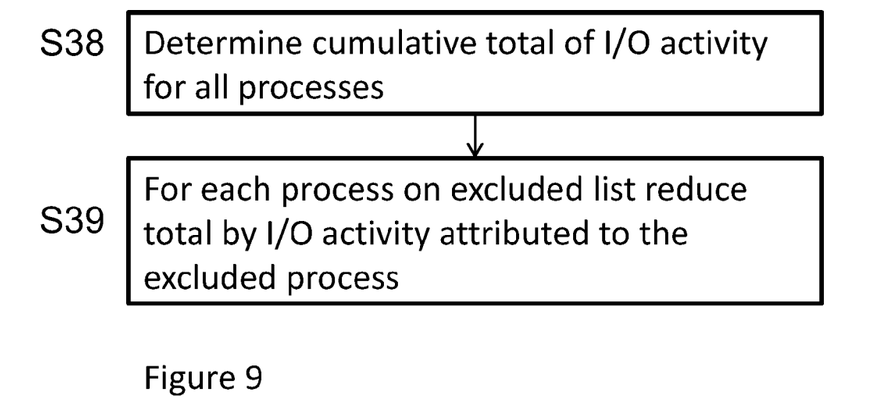
FIG. 9 a diagram illustrating the calculation of net I/O activity.

Determine Net Useful I/O Activity D: FIG. 9

Value D may be a based on a measure of net useful I/O activity.

The measure of I/O activity is the average number of bytes being read and written in each of the time slots t.

In this example, I/O activity is a single value which is the sum of network I/O, disc I/O and device I/O.

Net useful I/O activity is determined as shown in FIG. 9. In step S38, the total I/O activity is determined and the total value is stored. The total value includes contributions from all processes running on the computer at the time of measurement plus activity attributable to the kernel of the operating system. In step S39, the activity of each excluded process is subtracted from the total activity of step S38 and the net value determined.

Steps S38 and S39 may be implemented as shown in FIG. 6 with I/O activity substituted for CPU activity. The list of excluded processes is the same for both CPU activity and I/O activity, in this example but different lists may be used for CPU activity and I/O activity.

I/O activity associated with the storage of the computer may be monitored separately from network I/O. Also, I/O activity of a device may be measured separately. If so, net useful values are determined separately for each type of I/O activity.

Figure 10:
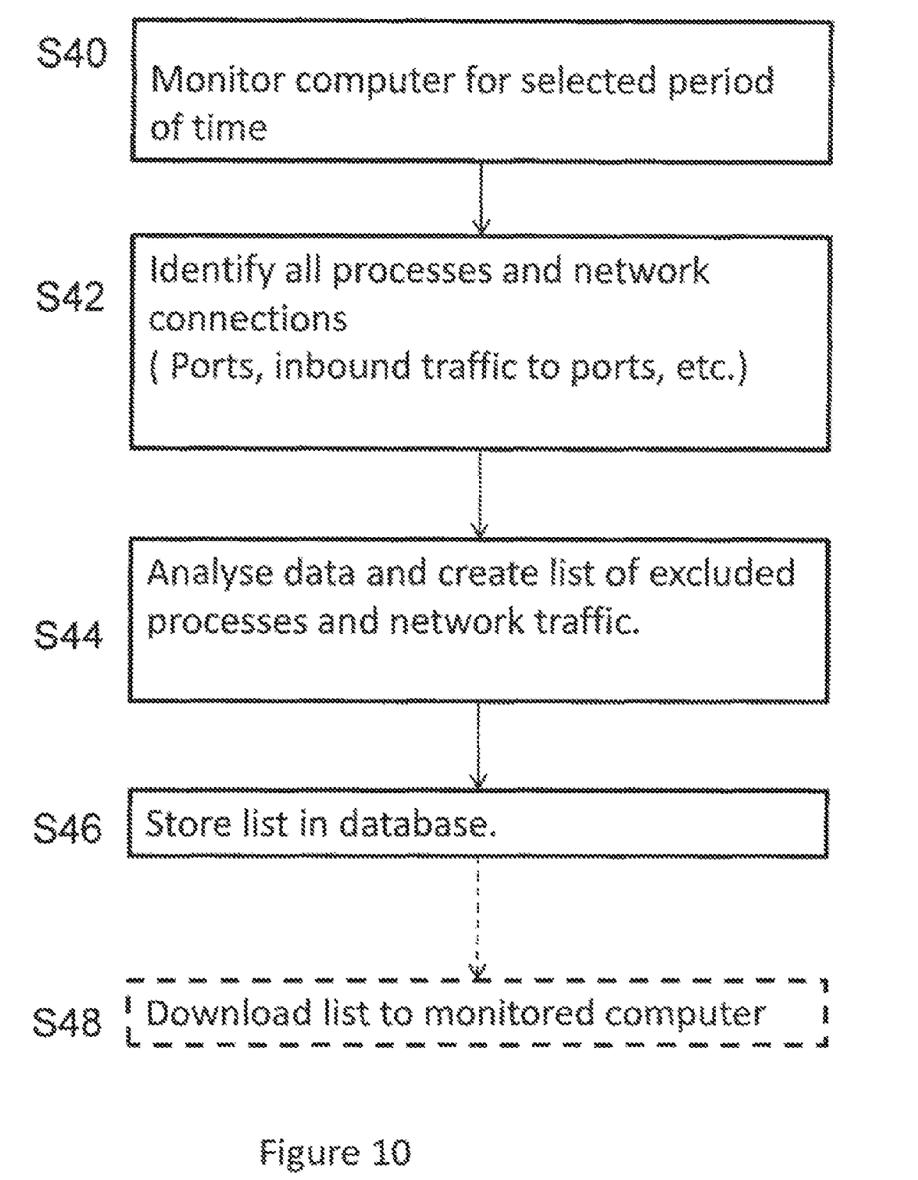
FIG. 10 is a diagram illustrating the production of a list of excluded activities.

Creating Data Sets of Excluded Processes and Incoming TCP/IP Connections FIG. 10.

As discussed above the embodiments of the invention use data sets of lists of excluded processes and incoming TCP/IP connections. An excluded incoming TCP/IP connection is identified by the combination of a port number and a process.

To produce the lists, in step S40 of FIG. 10, a computer is monitored for a suitable period of time. The time may be a day, a week, a month or any other time deemed to be suitable. The time should be long enough to be confident that all activity of the monitored computer is monitored. The monitoring is done by an agent on the monitored computer which obtains process names and port numbers from the operating system in known manner as discussed above and transmits the combinations of process names and port numbers to the database of FIG. 1. The agent may also obtain data other data, for example source IP address of incoming TCP/IP connections, data identifying any connection to a process X, any connection to a port Y or any connection from a source IP address Z.

Step S42 identifies all processes run on the computer over the monitoring period, and all incoming network connections of that period. The names of the processes are stored and the combinations of port numbers and process names identifying network connections are stored.

In step S44, a person, for example a network administrator, analyses the stored process names and names of ports and processes identifying network connection. The person creates a first data set of excluded processes and a second data set of excluded network connections identified by the combinations of process names and port numbers. The person uses their judgment to produce the data sets. The person also uses their judgment to set threshold values for the net useful values. In step S46, the data sets and thresholds are stored in the database of FIG. 1.

Figure 11:
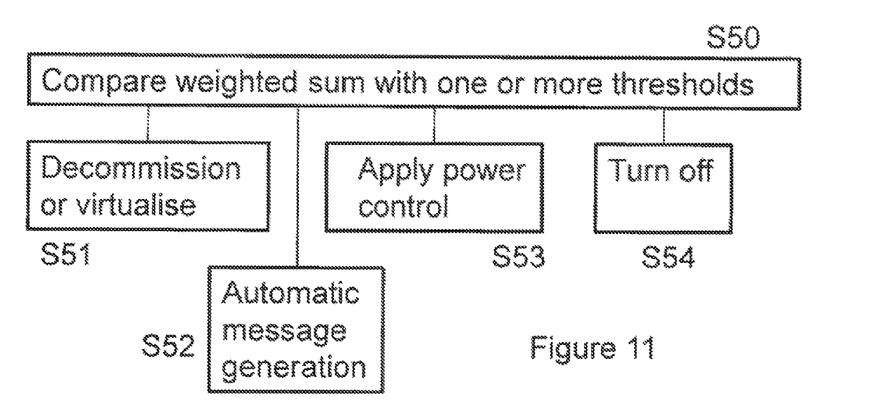
FIG. 11 is a flow diagram of methods of using the performance measure.
Figure 13:
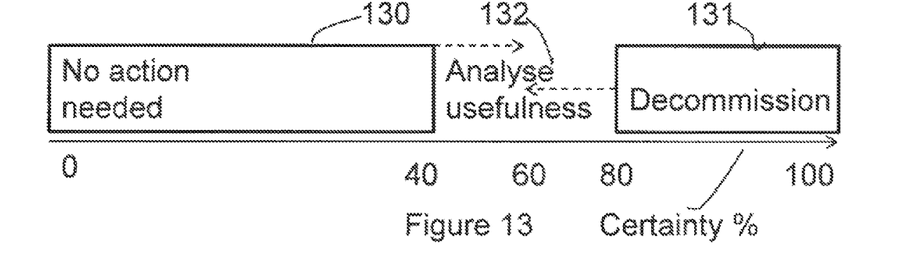
FIG. 13 is a diagram indicating an example of decisions which may be made according to the value of the performance measure.

In step S48, the data sets and the thresholds are downloaded to the monitored computer for use by the agent on the monitored computer which controls the power of the computer.
Comparison: FIGS. 11 and 13

The value of the weighted sum is compared with one or more thresholds. In the example given above, the weighted sum is a measure of the certainty that the monitored server is not useful. The computer may be controlled, or otherwise acted upon, in dependence on the value of the weighted sum. So, referring by way of example to FIG. 13, if the certainty value is greater than 80% the server is a candidate to be decommissioned as indicated at 131 in FIG. 13 and S51 in FIG. 11. Alternatively the server is a candidate for its service to be implemented by a virtual machine. If the certainty value is less than 40% then no action is needed: the server is deemed to be performing a useful function. For certainty values between 40% to 80%, (132 in FIG. 13), the administrator may analyse the performance of the server and decide what action if any is needed. For example if the value is greater than 60% he may decommission the server or virtualise it, and if less than 60% he may decide to take no action. A server which is decommissioned may be assigned to another service.

The comparison of the certainty value with the one or more thresholds may be used to automatically generate S52 a message to the administrator or any other addresses indicating the result of the comparison. The message may include details of recommended actions to be taken by the addressee.
FIG. 11 and Power Control The comparison may be used to automatically apply power control to the server. For example, if the certainty value is greater than 80% the server may be automatically turned off as at S54 or if the value is between 40% and 80% it may be forced into a low power state as at S53.
Low Power State As described above, the computer is initially in a full power state, and it adopts a low power state in dependence on the net activity level.

Examples of low power states include, amongst others:
i) The server is set to operate in its lowest power state whilst still fully operational. For example the CPU is controlled to operate in its minimum power state with the clock at its lowest frequency setting, and network cards and other cards of the server are set to their lowest power state and lowest frequency of operation;
ii) Sleep/Standby—The processor is powered down but the system state is preserved as the memory subsystem (RAM) which remains powered;
iii) Hibernate—The processor and RAM are powered down and the system state stored in non-volatile memory, e.g. hard disk; and
iv) Shut down—The Computer is powered down but power may be applied to certain components such that the server can be triggered to wake-up.

Figure 12:
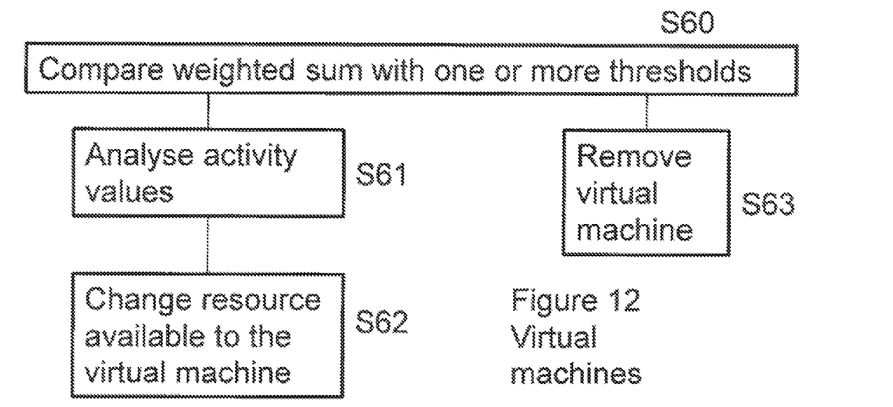
FIG. 12 illustrates the application of the performance measure to virtual machines.

FIGS. 12 and 13 Virtual Machines

Virtual machines may be monitored in the same way as described above to determine the value of the weighted sum of a combination of the following factors:
1) Utilization U,
2) Data I/O D
3) Inbound TCP/IP connections T
4) Logons L
5) Business value B and
6) Creation date of the virtual machine.

The same weighted combination as discussed above may be used with the same weights W1 to W6.

The metrics which are used to determine the value of certainty are derived from the operating system of the virtual machine.

As with real computers, a virtual machine with a high value (e.g. above 80%) of certainty may be removed from the hardware on which it runs as indicated at S63 in FIG. 12 and 131 in FIG. 13. If the value is low e.g. less than 40% no action may be taken as indicated at 130 in FIG. 13. If the value is between 40% and 60% as indicated at 132 in FIG. 13, the administrator may analyse (S61) the data representing its performance and determine what action to take: for example a virtual machine may be reconfigured to use less resource as indicated at S62.
Setting Thresholds The thresholds indicated in FIG. 13 may be selected by the user or fixed by the designer. Values other than those shown may be used. For example the lower threshold may be about 50% instead of about 40%.
Variants The above described implementations are to be understood as illustrative examples of the invention. Further embodiments of the invention are envisaged. For example:
Using a Single Metric.

Whilst the invention has been illustrated with reference to a weighted sum based on a plurality of activity metrics, where a plurality is two or more, the invention may be implemented using only one metric for example CPU activity alone or the number of incoming TCP/IP connections occurring over the monitoring period P alone. The single metric is processed as described above as the sole member of the weighted sum C.

The examples described above monitor incoming TCP/IP connections. The invention is not limited to TCP/IP but may be applied to other connection oriented communications protocols. The invention is not limited to monitoring incoming connections: it may monitor outgoing connections in addition to or instead of incoming connections.

The servers 2n of the network of FIG. 1 may all be monitored in the same way with the same data sets of excluded processes and network connections. However, the servers 2n may be monitored using different data sets of excluded processes and network connections. Each server may be separately monitored to create data sets specific to that server. The data sets specific to a server would be stored in the database with an identifier which associates the data sets with the specific server.

Whilst examples of the invention have been described which involve monitoring a plurality of activities, for example four activities which are CPU activity, I/O activity, network connections and logons. However, the invention may be implemented monitoring only two activities for example CPU activity and I/O activity. More than four activities may be monitored. For example a single measure of I/O activity may be replaced by separate measures of network I/O, disc I/O and device I/O.

Whilst the invention has been described by way of example as using programs running on each of the servers 2n to monitor the servers, the servers may be monitored remotely.
Computer Programs and Program Carriers.

The invention may be implemented by a program or a set of programs, comprising program code which when run on a computer or set of computers causes the computer(s) to implement the methods described herein above. In one implementation of the invention:— a program is provided to monitor a server to provide data to the database for the purpose of producing the data sets of excluded activities;

a program may be provided on each server $2n$ to monitor the performance of the server; and a program is provided on the administrators workstation to enable the administrator to analyse the data received from the monitoring programs on the servers to produce the data set of excluded activities.

The programs may be carried by one or more articles or carriers. A carrier may be a signal, a communications channel, or a computer readable medium. A computer readable medium may be an article for example: a tape: a disc for example a CD or DVD: a hard disc; an electronic memory; or any other suitable non transitory carrier or data storage medium. The electronic memory may be a ROM, a RAM, Flash memory or any other suitable electronic memory device whether volatile or non-volatile.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. It will be appreciated from the foregoing description that the claims may be combined in combinations other than those specifically recited in the claims.

What we claim is:

1. A computer implemented method of monitoring the performance of a computer having an operating system, the method comprising:

running a monitoring program which interacts with the operating system of the computer to determine values of a plurality of activity metrics of the monitored computer; and calculating a weighted combination of functions of the determined values as a measure of performance of the monitored computer, wherein a value of each of the plurality of activity metrics of the monitored computer is a value excluding contributions to the value from one or more predetermined activities, and wherein said one or more predetermined activities are identified by data stored in a predetermined data set.

2. A method according to claim 1, wherein determining the said values comprises:

determining total values of the respective activity metrics of the monitored computer, determining the contribution(s) to said total values of said one or more predetermined activities, and subtracting said contribution(s) from said total values to provide net values, said weighted combination being a weighted combination of the net values.

3. A method according to claim 2, wherein data identifying said one or more predetermined activities is stored in said predetermined data set, and the data set is used to determine the contributions of which activities are subtracted from said total values.

4. A method according to claim 1, wherein determining the values of the activity metrics of the computer comprises summing the contributions to the metrics of processes running on the monitored computer and network connections active on the monitored computer which are not identified in said data set.

5. A method according to claim 1, wherein the computer is monitored over a predetermined period of time and the determined value of an activity metric is the total number of occurrences of an activity over the predetermined period.

6. A method according to claim 5, wherein at least one of said functions is the proportion of the predetermined period during which an activity metric has a value less than a threshold value weighted by a weight which is a function of the threshold value.

7. A method according to claim 6, wherein said activity metric which has a value less than a threshold value is CPU activity.

8. A method according to claim 6, wherein said activity metric which has a value less than a threshold value is data I/O activity.

9. A method according to claim 6, wherein the weighted function is further weighted by a weight which is a function of the predetermined period.

10. A method according to claim 1, wherein at least one of said functions of the weighted combination is the measured value of an activity metric weighted by a weight which is a function of the measured value.

11. A method according to claim 10, wherein said activity metric weighted by a weight which is a function of the measured value is the number of logons.

12. A method according to claim 10, wherein said activity metric weighted by a weight which is a function of the measured value is the number of network connections.

13. A method according to claim 10, wherein the weighted activity metric is further weighted by a weight which is a function of the predetermined period.

14. A method according to claim 1, wherein the weighted combination additionally includes a weighted function of a measure of an age of the computer.

15. A method according to claim 1, wherein the weighted combination additionally includes a weighted function of a value attributed to the computer.

16. A method according to claim 1, wherein an activity metric is a value of CPU activity and said predetermined activities are processes.

17. A method according to claim 1, wherein an activity metric is a value of I/O activity and said predetermined activities are processes.

18. A method according to claim 1, comprising controlling the computer in dependence on a value of the weighted combination.

19. A method according to claim 18, further comprising controlling the power state of the computer in dependence on the weighted combination.

20. A method according to claim 19, further comprising comparing the value of the weighted combination with a threshold value and controlling power in dependence on the comparison.

21. A computer programmed to carry out the method of claim 1.

22. A method according to claim 1 further comprising running on the computer a program which, monitors the activity of the computer for a selected period of time;

identifies all activities of the computer over the period of time; and sends data identifying all said activities to a remote computer.

23. A method according to claim 22 further comprising:
receiving from a monitoring program running on the computer data identifying all said activities of the monitored computer;
analyzing the data,
identifying those of said activities which do not contribute to a predetermined purpose of the computer, and
storing the identifications of the identified activities in a data set.

24. A method according to claim 22, comprising sending said data set to the monitored computer.

25. An article comprising a non-transitory computer readable medium storing a computer program comprising program code including a monitoring program which, when run on a suitable computer having an operating system, causes the computer to:
run the monitoring program which interacts with the operating system of the computer to determine values of a plurality of activity metrics of the monitored computer; and
calculate a weighted combination of functions of the determined values as a measure of performance of the monitored computer,
wherein each of said values of the plurality of activity metrics of the monitored computer is a value excluding contributions to the value from one or more predetermined activities, and
wherein said one or more predetermined activities are identified by data stored in a predetermined data set.

26. An article according to claim 25, wherein the non-transitory computer readable medium is a tape, disc electronic memory or other non-transitory carrier.

27. A computer implemented method of monitoring the performance of a computer having an operating system, the method comprising:
using a predetermined data set to identify at least one predetermined activity;
running a monitoring program which interacts with the operating system of the computer to monitor values of a plurality of activity metrics of the monitored computer in each of a succession of time slots;
determining a value of at least one activity metric of the monitored computer excluding the contribution to said value from said at least one predetermined activity identified from said data set;
sampling in each of the succession of time slots a total value of another activity metric of the controlled computer;
determining the contribution(s) of said at least one predetermined activity identified in said data set to said total value of the another activity metric; and
subtracting said contribution from said total value to provide another net value; and
calculating a weighted combination of functions of the net values as a measure of performance of the monitored computer.

28. A computer programmed to carry out the method of claim 27.

29. An article comprising a non-transitory computer readable medium storing a computer program comprising program code which, when run on a suitable computer having an operating system, causes the computer to:
use a predetermined data set to identify at least one predetermined activity;
run a monitoring program which interacts with the operating system of the computer to monitor values of a plurality of activity metrics of the monitored computer;
in each of a succession of time slots, determine, by interacting with the operating system, a value of an activity metric of the monitored computer excluding the contribution to said value of said at least one predetermined activity identified from said data set;
sample, by interacting with the operating system, in each of the succession of time slots a total value of another activity metric of the controlled computer;
determine the contribution of said at least one predetermined activity identified in said data set to said total value of the another activity metric; and
subtract said contribution from said total value to provide another net value; and
calculate a weighted combination of functions of the net values as a measure of performance of the monitored computer.

30. An article according to claim 29, wherein the non-transitory computer readable medium is a tape, disc electronic memory or other non-transitory carrier.

31. A computer implemented method of monitoring the performance of a computer having an operating system, the method comprising:
running a monitoring program which interacts with the operating system of the computer to determine a value of an activity metric of the monitored computer;
selecting a weight which has a value related to the determined value of the activity metric; and
calculating, as a measure of performance of the monitored computer, a function of the determined value weighted by the selected weight.

32. A method according to claim 31, wherein said weight is dependent on the value of the activity metric.

33. A method according to claim 31, wherein the computer is monitored over a predetermined period of time and the determined value of said activity metric is the total number of occurrences of an activity over the predetermined period, wherein at least one of said functions of a weighted combination is the proportion of the predetermined period during which the activity metric has a value less than a threshold value which is weighted by a further weight which is a function of the threshold value.

34. A method according to of claim 33, wherein the weighted function is further weighted by a weight which is a function of the predetermined period.

35. A computer programmed to carry out the method of claim 31.

36. An article comprising a non-transitory computer readable medium storing a computer program including a monitoring program comprising program code which, when run on a suitable computer having an operating system, causes the computer to:
run the monitoring program which interacts with the operating system of the computer to determine a value of an activity metric of the monitored computer;
select a weight which has a value related to the determined value of the activity metric; and
calculate, as a measure of performance of the monitored computer, a function of the determined value weighted by the selected weight.

37. An article according to claim 36, wherein the non-transitory computer readable medium is a tape, disc electronic memory or other non-transitory carrier.

* * * * *